Jan. 3, 1950

H. V. HESS 2,493,537

AZEOTROPIC DISTILLATION OF HYDROCARBONS WITH SULFUR DIOXIDE

Filed March 23, 1948

INVENTOR.
HOWARD V. HESS
BY
ATTORNEYS

INVENTOR.
HOWARD V. HESS

Patented Jan. 3, 1950

2,493,537

UNITED STATES PATENT OFFICE 2,493,537

AZEOTROPIC DISTILLATION OF HYDROCARBONS WITH SULFUR DIOXIDE

Howard V. Hess, Fishkill, N. Y., assignor to The Texas Company, New York, N. Y., a corporation of Delaware Application March 23, 1948, Serial No. 16,506

3 Claims. (Cl. 202—42)

This invention relates to certain improvements in the azeotropic distillation of hydrocarbons with sulfur dioxide to effect a separation into olefinic and paraffinic fractions.

The use of sulfur dioxide as an azetrope former has been proposed but has been difficult in practice because of the formation of polysulfones. These polysulfones are solid or plastic resinous materials and the formation of them by the contacting of the sulfur dioxide with olefins results in a reduction in the yield of desired products. Furthermore it frequently happens that the formation of the resinous material is of such extent as to cause a plugging of the lines in the distilling equipment and render the operation inoperative.

I have discovered that the formation of these resinous materials may be completely eliminated by avoiding the contacting of the sulfur dioxide and the hydrocarbon mixture containing olefins while at temperatures at which the reactions producing the polysulfones occur and by conducting the azeotropic distillation at temperatures above that of the formation of polysulfones. The temperature necessary to prevent the polysulfone formation will vary with the particular olefins contained in the hydrocarbon mixture which is to be separated into olefinic and paraffinic fractions. The maximum temperatures at which polysulfone formation occurs with certain olefins has been found to be approximately as follows:

| | °F. |
|---|---|
| Isobutylene | 39–41 |
| Butylene-2 (cis and trans mixture) | 109–111 |
| Butylene-1 | 145–150 |
| Propylene | 188–192 |

In accordance with my invention the formation of polysulfones is avoided by preheating prior to contacting so that when the hydrocarbon and sulfur dioxide are brought into contact for azeotropic distillation the composite temperature will be above the temperature of polysulfone formation. It is to be observed that this temperature above the maximum for formation of polysulfones should be maintained generally throughout the distilling zone or at least in all portions of the equipment at which material proportions of olefins and sulfur dioxide may be in contact.

In practicing the invention the sulfur dioxide and the hydrocarbon mixture to be treated are separately heated to a temperature above the maximum temperature of polysulfone formation prior to being brought into contact with each other. Thus in a continuous operation the sulfur dioxide and hydrocarbon mixture are passed thru separate heating zones and brought to the desired temperature and are then discharged into the distilling tower wherein the azeotropic distillation takes place. The two preheated streams may be commingled to enter the tower as a single stream or they may be admitted to the tower as separate streams. An advantageous operation is to admit the sulfur dioxide stream at a point above that of the entry of the hydrocarbon stream. Due to the selective solvent action of the sulfur dioxide for olefins this latter method promotes a selective extraction to take place which thus aids in effecting the separation between the paraffins and olefins.

Figure 1:
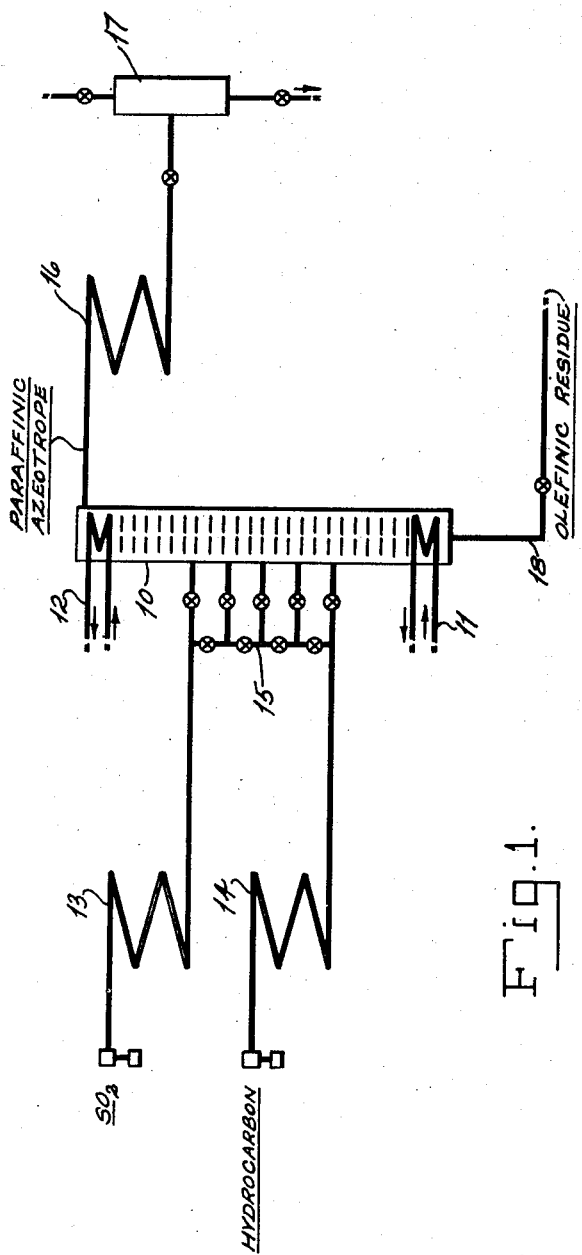
Fig. 1 is a flow diagram illustrating one method of practicing the invention.
Figure 2:
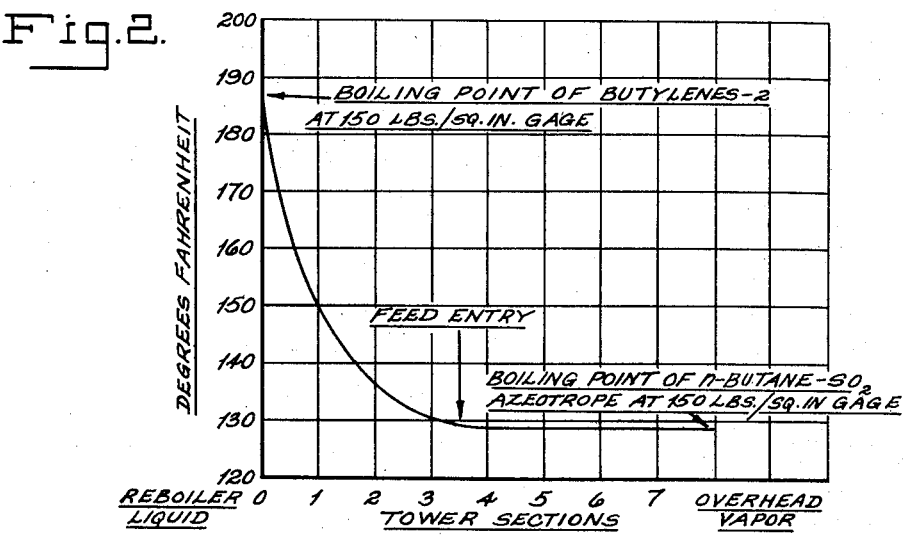
Fig. 2 is a graph showing the temperature gradient through the distilling tower in a typical operation.

Referring to Fig. 1 the element 10 represents a distilling tower adapted for the azeotropic distillation. The tower is provided with suitable bubble trays, packing or contact material adapted for efficient vapor-liquid contacting. A heating coil 11 is provided at the bottom and a cooling coil 12 is disposed at the top.

The sulfur dioxide is passed through a heating coil 13 wherein it is heated to a temperature somewhat exceeding the maximum or ceiling temperature of polysulfone formation. The hydrocarbon charge, such as $C_3$, $C_4$ and $C_5$ hydrocarbons containing mixtures of olefins and paraffins, is passed through a heating coil 14 wherein it is similarly heated to a temperature above this ceiling temperature. The effluent from the heating coils 13 and 14 passes to a manifold 15 by which the sulfur dioxide and hydrocarbon may be discharged into the tower at various intermediate points therein. As will be readily seen the effluent from the two streams may be merged in the manifold for entry into the tower as a single composite stream or the sulfur dioxide and hydrocarbon may be admitted separately with the sulfur dioxide entering at a point above that of the hydrocarbon.

In the tower 10 azetropic distillation takes place with the paraffin azeotrope passing overhead as vapor and the olefin or olefin and sulfur dioxide collecting in the bottom of the tower. The vapors pass through a condenser 16 and the condensate is collected in a receiving drum 17. The olefin fraction is withdrawn from the bottom of the tower through a line 18. The temperature in the reboiler section of the tower is maintained by the heating coil 11 at a temperature somewhat exceeding the temperature of the effluent from the heating coils so as to assure that throughout the tower and at least where any material proportions of olefins are present the temperature will be maintained above the ceiling temperature of polysulfone formation of the olefins present. The tower is held under a superatmospheric pressure adapted to raise the boiling points of the components so that the temperature may be held above the temperature of polysulfone formation and the paraffin azeotropes distilled overhead.

In one method of operation only sufficient sulfur dioxide is charged to form azeotropes with the paraffins in the hydrocarbon mixture and in this method the paraffin azeotropes are distilled overhead and the olefin fraction which will be substantially free from SO₂ is withdrawn as the bottom fraction. It may be mentioned that when operating in this way the composition of the bottoms may not always immediately reach a condition where it is entirely free from SO₂. A certain reservoir of liquid is necessarily maintained in the reboiler section of the tower and consequently an interval must elapse in order for the bottoms to attain the desired degree of olefin purity.

In another method of operation an excess of sulfur dioxide over that required to form azeotropes with the paraffins is charged to the system and in such case sulfur dioxide will be present in the olefin residue withdrawn from the tower.

In an example of the invention a hydrocarbon stock consisting of approximately equal portions of normal butane and butylenes-2 was heated to a temperature of 140° F. and continuously introduced to the tower at a point about ¾ up from the bottom of the tower. Sulfur dioxide in a proportion in excess of that required to form azeotropes with the butane was preheated to the same temperature and continuously introduced at a point about ¼ up from the bottom of the tower. The tower was held under a gauge pressure of 180 lbs. per sq. in. The reboiler temperature was 175° F. and the overhead temperature 140° F. The following table shows the number of hours on stream with the weight per cent of saturates in the overhead, the weight per cent of unsaturates in the bottoms and the reflux ratio in the several periods:

| Hours on Stream | Overhead Wt. Per Cent Saturates | Bottoms Wt. Per Cent Unsaturates | Reflux Ratio |
|---|---|---|---|
| 2.5 | 98.8 | 96.7 | 16 |
| 5.5 | 99.6 | 97.9 | 17 |
| 8.5 | 99.4 | 100.0 | 13 |
| 11.5 | 98.7 | 99.1 | 14 |
| 14.5 | 99.0 | 99.9 | 14 |

In another example of the invention the hydrocarbon stock containing equal portions of normal butane and butylenes-2 and the sulfur dioxide in amount only sufficient to form azeotropes with the butane were separately heated to 132° F. and introduced at a point ¾ up from the bottom of the tower. The tower was held at 155 lbs. per sq. in., the reboiler temperature was 195° F. and the overhead temperature 130° F. The following table gives the hours on stream with the weight per cent of saturates in the overhead, the weight per cent of unsaturates in the bottoms and the reflux ratio during the several periods.

| Hours on Stream | Overhead Wt. Percent Saturates | Bottoms Wt. Per cent Unsaturates | Reflux Ratio |
|---|---|---|---|
| 3 | 98.6 | 96.2 | 17 |
| 6 | 99.3 | 97.0 | 16 |
| 9 | 99.4 | 97.5 | 16 |
| 12 | 99.1 | 99.8 | 17 |
| 15 | 99.3 | 93.3 | 17 |
| 18 | 99.3 | 99.5 | 17 |
| 21 | 99.7 | 100.0 | 16 |

Figure 3:
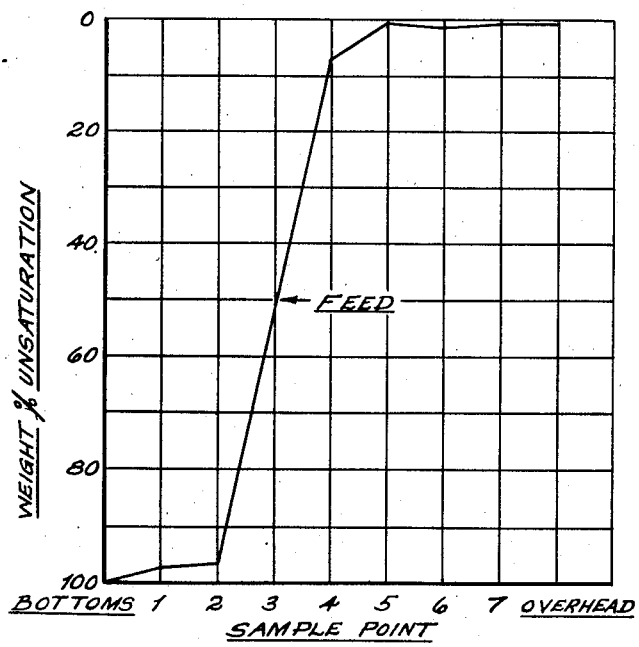
Fig. 3 is a graph showing the percentage of unsaturates in various portions of the tower in a typical operation.

Fig. 3 shows the percentage of unsaturates in samples of the liquid withdrawn from various points in the tower and in the bottoms and overhead distillate during a period in this run.

With the stock treated in each of these runs the top temperature at which polysulfone formation could have taken place would have been about 109–111° F. By maintaining minimum temperatures in the one case of 140° F. and in the other of 130° F. the operation was conducted safely above the level of polysulfone formation and an effective separation into paraffin and olefin fractions was accomplished.

The method in which only sufficient sulfur dioxide is used to form azeotropes with the paraffin has the advantage that the olefinic residue free from sulfur dioxide may be readily withdrawn without any precautions as regards the formation of polysulfones. When operating with an excess of sulfur dioxide over that required for the formation of paraffinic azeotrope with the result that SO₂ is present in the olefinic residue the withdrawal line should be kept at a temperature above the maximum temperature of polysulfone formation. In reference to the presence of olefins in the paraffinic overhead, it has been determined that as regards a mixture of butane and butylenes-2 for instance, proportions of olefin up to as much as 5% gave no evidence of polysulfone formation even at low temperatures. In view of the fact that in the practice of the invention an overhead product containing even less than 5% olefins may be obtained, it will be seen that there is ordinarily no difficulty in cooling and condensing the overhead product. However, instead of passing the overhead paraffinic azeotrope through a condenser coil as indicated in Fig. 1, the vapors may be passed directly to a tower and washed with water or caustic solution.

When operating with sulfur dioxide present in the residue withdrawn from the azeotropic distilling tower quantities of monosulfone may be present in which case the olefinic residue may be passed through a heat treating zone by which the monosulfone is readily converted into olefin and SO₂ and the products then washed with water or caustic solution to recover the olefin product.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the azeotropic distillation of hydrocarbon stocks consisting of paraffins and mono-olefins with sulfur dioxide as the azeotrope former, the process that comprises separately heating the hydrocarbon and the sulfur dioxide prior to contacting, then contacting the heated hydrocarbon and sulfur dioxide at a temperature above the temperature of polysulfone formation and conducting the azeotropic distillation at temperatures in excess of such temperature.

2. In the azeotropic distillation of hydrocarbon stocks consisting of paraffins and mono-olefins with sulfur dioxide as the azeotrope former, the process that comprises separately heating the hydrocarbon and the sulfur dioxide prior to contacting to a temperature above the temperature adapted to sustain polysulfone formation, then contacting the heated hydrocarbon and sulfur dioxide and effecting azeotropic distillation at a temperature above that of polysulfone formation.

3. In the azeotropic distillation, with sulfur dioxide as the azeotrope former, of hydrocarbon stocks comprising essentially paraffins and mono-olefins and substantially free from diolefins, the process that comprises separately heating the hydrocarbon and the sulfur dioxide, then contacting the heated hydrocarbon and sulfur dioxide at a temperature above the temperature of polysulfone formation and conducting the azeotropic distillation at temperatures in excess of such temperature.

HOWARD V. HESS.

REFERENCES CITED

The following references are of record in the file of this patent:

UNITED STATES PATENTS

| Number | Name | Date |
|---|---|---|
| 2,186,524 | Frey | Jan. 9, 1940 |
| 2,207,608 | Britton et al. | July 9, 1940 |
| 2,316,860 | Guinot | Apr. 20, 1943 |
| 2,332,493 | Petry et al. | Oct. 19, 1943 |
| 2,333,856 | Gerhold | Nov. 9, 1943 |
| 2,356,840 | Frey | Aug. 29, 1944 |
| 2,382,473 | Frey | Aug. 14, 1945 |
| 2,390,934 | Gregg | Dec. 11, 1945 |
| 2,412,880 | Frey | Dec. 17, 1946 |